(12) United States Patent
Koerdt et al.

(10) Patent No.: US 11,920,629 B2
(45) Date of Patent: Mar. 5, 2024

(54) METHOD FOR FITTING A SNAP FIT ARRANGEMENT AND A CORRESPONDING FITTING ARRANGEMENT

(71) Applicant: Hella GmbH & Co. KGaA, Lippstadt (DE)

(72) Inventors: Christian Koerdt, Geseke (DE); Heinrich Schäfer, Bad Wünnenberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/639,230

(22) PCT Filed: Sep. 25, 2017

(86) PCT No.: PCT/EP2017/074185
§ 371 (c)(1),
(2) Date: Feb. 14, 2020

(87) PCT Pub. No.: WO2019/057306
PCT Pub. Date: Mar. 28, 2019

(65) Prior Publication Data
US 2020/0208663 A1 Jul. 2, 2020

(51) Int. Cl.
*F16B 5/06* (2006.01)

(52) U.S. Cl.
CPC .................. *F16B 5/0664* (2013.01)

(58) Field of Classification Search
CPC ........ F16B 5/0635; F16B 12/26; F16B 12/38; F16B 5/0016; F16B 5/0642; F16B 5/0657; F16B 5/0664; H05K 5/02; H05K 5/0208

USPC .......................................................... 29/453
See application file for complete search history.

(56) References Cited

U.S. PATENT DOCUMENTS

| | | | | |
|---|---|---|---|---|
| 195,117 A | * | 9/1877 | Frankel | G06F 1/1656 24/683 |
| 832,284 A | * | 10/1906 | White | E05C 19/06 4/267 |
| 3,476,421 A | * | 11/1969 | Torres | E04B 1/1906 403/173 |

(Continued)

FOREIGN PATENT DOCUMENTS

| EP | 1160128 B1 | 1/2010 |
|---|---|---|
| FR | 2859871 A1 | 3/2005 |

OTHER PUBLICATIONS

English Machine Translation of FR2859871A1 to Larsky et al. (Published Mar. 18, 2005) (Year: 2005).*

*Primary Examiner* — Jason L Vaughan
(74) *Attorney, Agent, or Firm* — Husch Blackwell LLP

(57) ABSTRACT

A method is provided for fitting a snap fit arrangement, as well as a fitting arrangement for fitting the snap fit arrangement for joining a first part with a second part. The snap fit arrangement comprises an engagement hook which is arranged at the first part. The snap fit arrangement comprises a latch element which is arranged at the second part. When the snap fit arrangement closes, the engagement hook deforms elastically and engages into the latch element. In the method, an auxiliary tool is provided. The elastic deformation is caused in the engagement hook by means of the auxiliary tool. The first part is joined to the second part and retracting the auxiliary tool. Retracting causes a spring-back of the elastic deformation in the engagement hook.

9 Claims, 2 Drawing Sheets

(56) References Cited

U.S. PATENT DOCUMENTS

| | | | |
|---|---|---|---|
| 3,724,150 A * | 4/1973 | Hudnall | F16B 2/245 174/486 |
| 4,221,039 A * | 9/1980 | Smith | B25B 9/02 24/458 |
| 4,672,732 A * | 6/1987 | Ramspacher | F16B 5/02 29/429 |
| 4,673,100 A * | 6/1987 | Reis | H05K 5/0013 292/87 |
| 4,840,286 A * | 6/1989 | Heberling | H05K 5/0013 361/728 |
| 5,348,356 A * | 9/1994 | Moulton | E05B 37/20 292/87 |
| 5,377,510 A * | 1/1995 | Smith | E05B 35/008 128/878 |
| 5,702,021 A * | 12/1997 | Ito | H01R 13/506 220/780 |
| 5,931,514 A * | 8/1999 | Chung | F16B 12/26 292/87 |
| 5,944,210 A * | 8/1999 | Yetter | H02G 3/14 220/241 |
| 6,006,941 A * | 12/1999 | Hitchings | E05C 19/06 220/326 |
| 6,412,633 B1 * | 7/2002 | Costa | E05B 73/0023 220/326 |
| 7,413,479 B1 * | 8/2008 | Volpone | H01R 13/506 439/352 |
| 7,553,180 B2 * | 6/2009 | Hu | H05K 5/0221 439/352 |
| 8,648,264 B2 * | 2/2014 | Masumoto | H02G 3/14 220/281 |
| 8,851,291 B2 * | 10/2014 | Haggard | G11B 33/025 206/710 |
| 2011/0318089 A1 * | 12/2011 | Peng | F16B 5/0635 403/9 |
| 2012/0054992 A1 * | 3/2012 | Liu | F16B 12/26 24/573.11 |
| 2012/0187812 A1 * | 7/2012 | Gerst | F16B 5/0664 312/237 |
| 2013/0027852 A1 * | 1/2013 | Wang | G06F 1/184 361/679.01 |
| 2015/0010345 A1 * | 1/2015 | Takita | B60R 13/0212 403/322.4 |
| 2015/0260212 A1 * | 9/2015 | Cochran | F16B 12/46 29/428 |
| 2017/0059814 A1 * | 3/2017 | Lang | F16B 21/065 |
| 2020/0158152 A1 * | 5/2020 | Chorny | F16B 21/078 |

* cited by examiner

METHOD FOR FITTING A SNAP FIT ARRANGEMENT AND A CORRESPONDING FITTING ARRANGEMENT

CROSS REFERENCE

This application claims priority to PCT Application No. PCT/EP2017/074185, filed on Sep. 25, 2017, the entirety which is hereby incorporated by reference.

FIELD OF THE INVENTION

The invention relates to a method for fitting a snap fit arrangement and to a fitting arrangement for fitting the snap fit arrangement for joining a first part with a second part, in particular for lighting applications, whereas the snap fit arrangement comprises an engagement hook which is arranged at the first part and whereas the snap fit arrangement comprises a latch element which is arranged at the second part, whereas when the snap fit arrangement closes, the engagement hook deforms elastically and engages into the latch element.

BACKGROUND

In lighting applications for headlights of vehicles a first part can represent a cover frame made of a metallic blanked part and the second part can be represented by a supporting frame, made of plastic. When the cover frame must be fitted to the supporting frame, the metallic engagement hook gets in contact to a latch element, which is formed as a part of the plastic supporting frame.

Another application is known from EP 1 160 128 B1. The disclosure relates to a lighting and/or signaling device for a vehicle, comprising a first part which comprises a clipping lock and a second part which comprises at least one wall which defines a receptacle for receipt of the lock for clipping the two parts to one another. Usually when both parts are made of plastic, no abrasion is caused at the surface of the snap fit arrangement parts, in particular from the surface of the latch element. In the case, when e.g. the first part is made of a metallic blanked part, having a burr at the cutting edge caused by the cutting or stamping process to produce the blanked part, this burr causes an abrasion in the surface of the latch element, which forms a section of the second part made of plastic. In other cases, when both parts to be joined one to another with a snap fit arrangement are made of a plastic material, molding flashes can arise in the mold parting line, which flashes may also can be rubbed-off. The rubbed-off parts caused by the abrasion fall e.g. into the housing of the headlight and lead to a contaminant of the headlight because the rubbed-off parts form a foreign material. As a result, rubbed-off parts must be avoided, although snap fit arrangements should be used, because these joint-technology is cheap and well suitable for mass production.

SUMMARY OF THE INVENTION

In order to overcome the above defined disadvantages of existing snap fit arrangements and the methods to join a first part with a second part comprising a snap fit arrangement, it is an objective of the invention to avoid the appearance of rubbed-off parts in the surface of at least one part of the snap fit arrangement, in particular in the surface of a plastic component.

This object is achieved by a method for fitting a snap fit arrangement. Additionally, this object is achieved by a fitting arrangement for fitting a snap fit arrangement with related characterizing features. Advantageous embodiments of the inventive method and the inventive fitting arrangement are provided.

The method for fitting a snap fit arrangement according to the invention comprises at least the following steps: Providing an auxiliary tool, causing the elastic deformation in the engagement hook by means of the auxiliary tool, joining the first part to the second part and retracting the auxiliary tool, which retracting causes a spring-back of the elastic deformation in the engagement hook.

The core idea of the inventive method is to avoid a contact of the engagement hook with the latch element during the movement of the first part towards the second part. As a result, the rubbed-off parts in the surface of the plastic latch element are avoided, and no more debris or any other foreign material can fall into the housing of the e.g. headlight or signal lighting device of the vehicle. The elastic deformation in the engagement hook is only caused during the movement of the first part towards the second part, and the elastic deformation can begin with the movement of the first part towards the second part, and when the first part and the second part have the final positions one to each other, the auxiliary tool can be retracted and the elastic deformation in the engagement hook features a spring-back behavior, and with this spring-back movement the engagement hook engages into the latch element, and the snap fit arrangement is fitted.

As a preferred embodiment, in the engagement hook an elastic deformation is caused in order to avoid the contact to the latch element while the first part is fitted to the second part. According to another preferred embodiment, the engagement hook comprises at least one blade extension, whereas when the auxiliary tool interacts with the engagement hook, the auxiliary tool comes into contact with the blade extension and causes a tilting effect in the engagement hook which leads to its elastic deformation. In other words, the auxiliary tool moves relative to the first part in a way that the auxiliary tool interacts with the blade extensions of the engagement hook, in order to cause the elastic deformation in the engagement hook. It is clear to understand that the elastic deformation can be caused within the engagement hook or in the connecting section of the engagement hook to the first part. The engagement hook may be formed as a tongue with an engagement edge, which engagement edge engages behind a nose shape of the latch element, when the snap fit arrangement is fitted. According to another advantage, the first part features openings in the metallic blanked body in order to insert the auxiliary tool and to cause a force on the backside of the engagement hook, so as to bend the engagement hook into a direction against the direction of snapping into the latch element. When the first part is moved towards the second part, the latch element passes the engagement edge of the engagement hook without a contact of the surfaces, and when the auxiliary tool is retracted the elastic deformation goes into the spring-back direction and the engagement hook engages into the latch element.

According to yet another embodiment, the first part is fitted to the second part in a fitting direction, whereas the auxiliary tool is moved in a tool moving direction which is the same direction like the fitting direction. The tool equipment can be simplified when the tool moving direction corresponds to the fitting direction, and when the first part and the second part are joined one to another in a handling system, the handling system can comprise an actuator unit for moving the auxiliary tool, and the actuator unit can be arranged to the handling tool in a simple manner due to the uni-directional mounting system with respect to any moving directions within the system.

Another preferred embodiment of the present invention comprises a first part which is provided as a metallic blanked part and the second part which is provided as a plastic part. By means of the tilting effect in the engagement hook a metallic engagement edge of the engagement hook as a part of the first part keeps space apart to a front surface of the plastic latch element which is a part of the second part. In other words, a surface contact between a metallic part and a plastic part is avoided by means of the auxiliary tool and the elastic deformation caused in the engagement hook. On the other hand, the auxiliary tool can also be used for joining two plastic parts to one another, because the plastic parts can comprise mold flashes, which also can be rubbed-off the surface of the latch element.

The invention is also directed to a fitting arrangement for fitting a snap fit arrangement in order to cause a joining of a first part with a second part, whereas the snap fit arrangement comprises an engagement hook which is arranged at the first part and whereas the snap fit arrangement comprises a latch element which is arranged at the second part, whereas when the snap fit arrangement closes, the engagement hook deforms elastically and engages into the latch element. According to the invention, an auxiliary tool is provided which is performed to cause the elastic deformation in the engagement hook while joining of the first part to the second part.

Moreover, the fitting arrangement may comprise a handling system with a component for receiving the first part and with a component for receiving the second part, and both components are moveable one to each other in order to fit the first part to the second part. The auxiliary tool can be a part of one of the both components, in particular of the component for receiving the first part, which is e.g. the metallic part made of a blanked sheet metal.

In its preferred embodiment, the auxiliary tool comprises one or preferred two shaft elements, which are movable in a tool moving direction which is the same direction like the fitting direction for joining the first part to the second part. As a result, the fitting arrangement features moved parts which are moved in an unidirectional matter, which simplifies the fitting arrangement.

According to yet another embodiment, the at least one shaft element is made of steel, and features a tapered tip to improve the engagement with the engagement hook. Moreover, the two shaft elements are spaced apart to each other with a distance which is adapted to receive the engagement hook in between the two shaft elements. When the engagement hook features blade extensions, the distance between the shaft elements is adapted to the distance of the blade extensions, and when the auxiliary tool gets into contact with the engagement hook, each of the shaft elements can contact each of the blade extensions.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
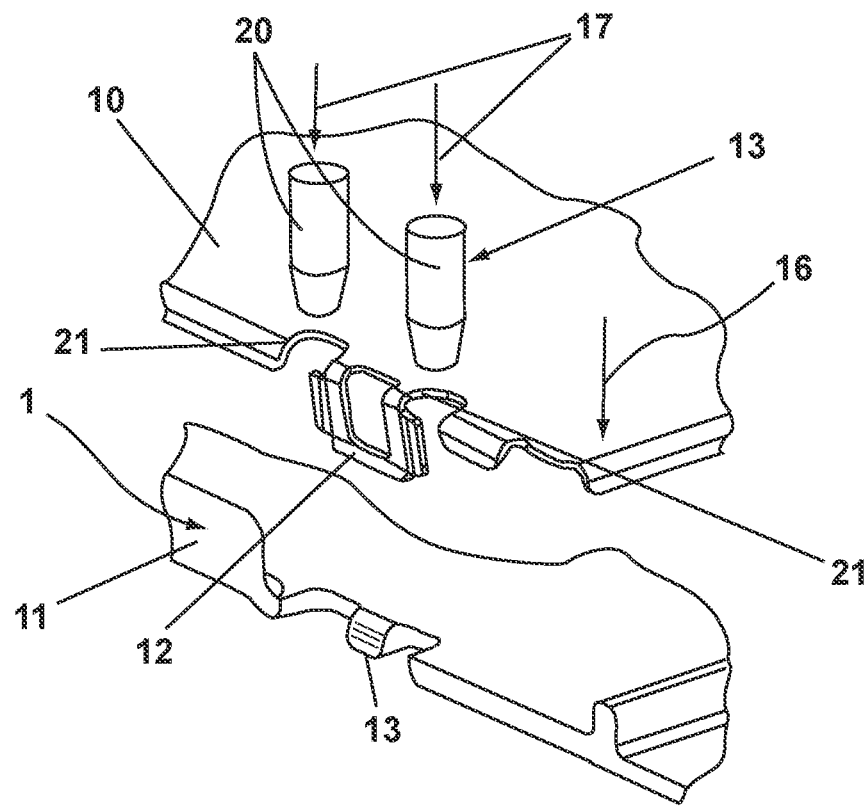
FIG. 1 shows a depiction of the first and the second part with the snap fit arrangement before joining the first and the second parts.

FIG. 1 shows a snap fit arrangement 1 between a first part 10 and a second part 11. The snap fit arrangement 1 comprises an engagement hook 12 arranged at the first part 10 and a latch element 13 arranged at the second part 11. The first part 10 is for example a metallic blanked part and the second part 11 is a plastic part e.g. produced by plastic injection molding. In other embodiments, both parts 10, 11 may be made of a plastic material, e.g. with different material specifications, so that one part is stiffer and one part is more flexible.

In a lateral position of the engagement hook 12, the first part 10 features openings 21, and the openings 21 are intended to receive shaft elements 20 which form the auxiliary tool 14. The shaft elements 20 are movable in a tool moving direction 17, which is the same direction as the fitting direction 16 to move the first part 10 towards the second part 11. When the shaft elements 20 are moved in the tool moving direction 17, the shaft elements 20 can pass the openings 21 and get into engagement with the engagement hook 12.

Figure 2:
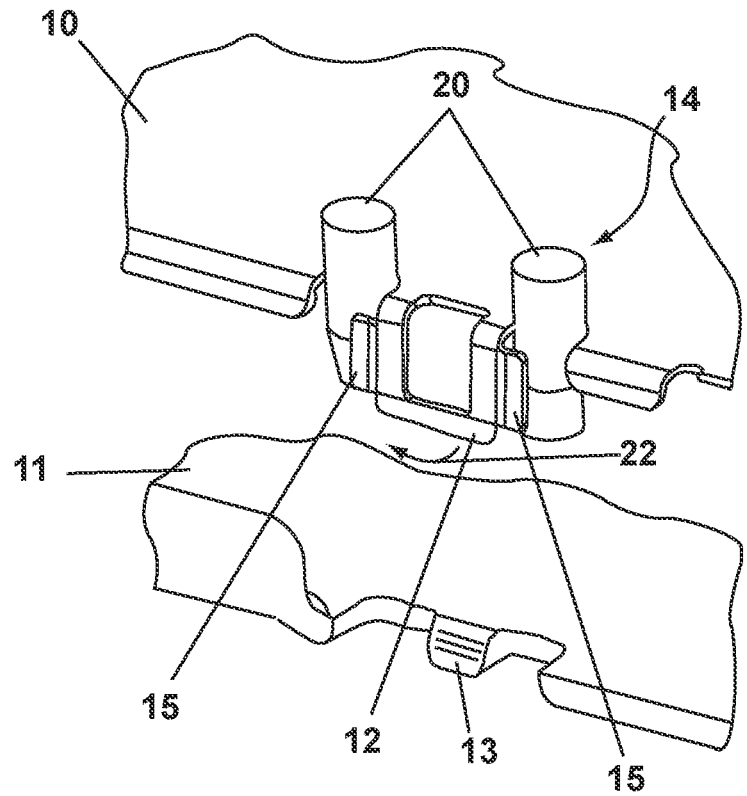
FIG. 2 shows the depiction of the first and second part according to FIG. 1, and an auxiliary tool engages into the engagement hook of the snap fit arrangement.

FIG. 2 shows the engagement of the shaft elements 20 forming the auxiliary tool 14, and the shaft elements 20 are in contact with the engagement hook 12. By means of the shaft elements 20 a tilting effect is caused in the engagement hook 12 according to the arrow 22, and the engagement hook 12 bends into a direction, which holds the engagement hooks 12 spaced apart from the latch element 13, when the first part 10 is moved towards the second part 11.

The engagement of the shaft element 20 with the engagement hook 12 is performed by blade extensions 15, and the shaft element 20 engages behind the blade extensions 15 to cause the elastic bending of the engagement hook 12 according to the arrow.

Figure 3:
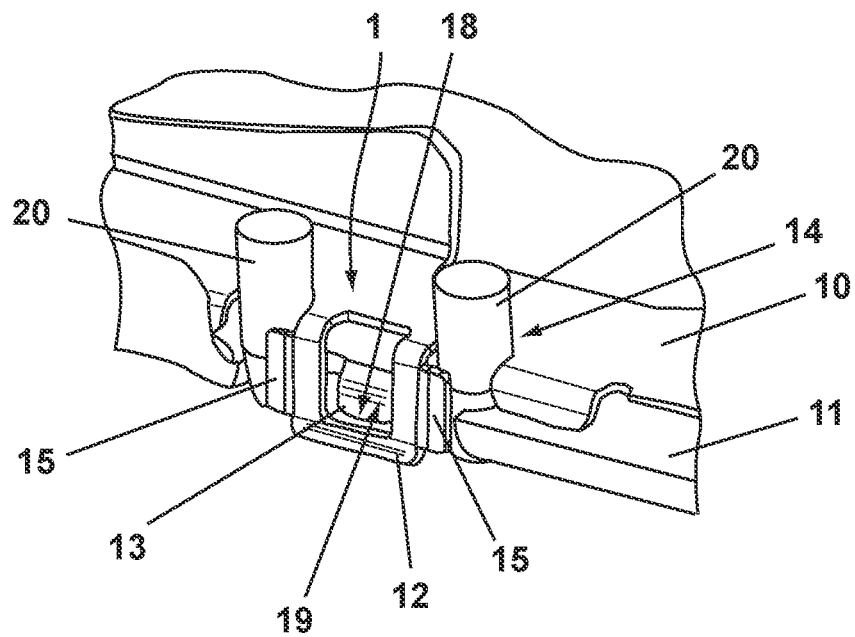
FIG. 3 shows the arrangement of the first and the second part during the joining, whereas the auxiliary tool remains in engagement with the engagement hook.

FIG. 3 shows the first part 10 in a final arrangement on the second part 11, and the shaft elements 20 are in interaction with the engagement hook 12. In this position, the effect is evident that a metallic engagement edge 18 of the engagement hook 12 does not get in contact with a front surface 19 of the latch element 13. This leads to the advantage that the front surface 19 is not damaged by a sharp burr of the engagement edge 18, and no rubbed-off parts arise, which parts can fall into e.g. the housing of a headlight. In order to finalize the fitting of the snap fit arrangement 1, the shaft elements 20 must be retracted and disengaged from the blade extensions 15 of the engagement hook 12, as shown in FIG. 4.

Figure 4:
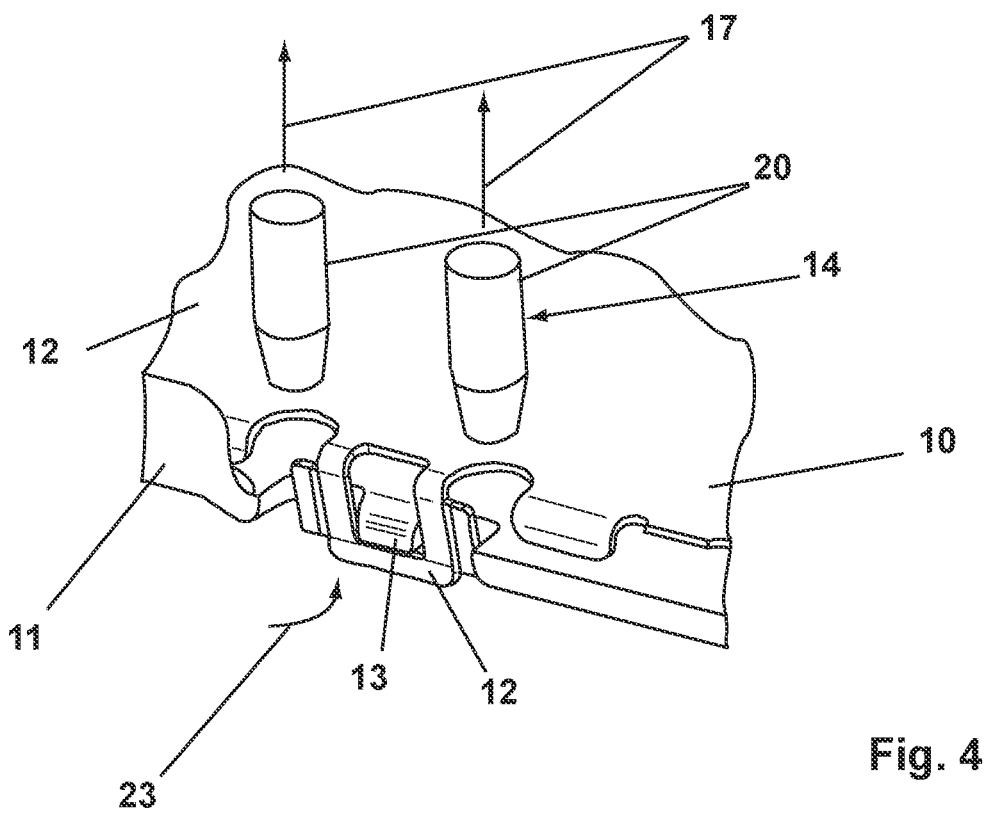
FIG. 4 shows the first and the second part with a closed snap fit arrangement, whereas the auxiliary took has been retracted.

FIG. 4 shows the finalized fitting of the snap fit arrangement 1, and the engagement hook 12 engages behind the latch element 13 as a result of a spring-back behavior of the elastic deformed engagement hook 12, as shown with the arrow 23. In this arrangement the first part 10 is joined to the second part 11, and the shaft elements 20 forming the auxiliary tool 14 are retracted by a movement in the tool moving direction 17. As a result the surface of the latch element 13 is not effected by the metallic first part 10 and no rubbed-off parts arise.

The aforementioned components, as well as the claimed components and the components to be used in accordance with the invention in the described embodiments are not subject to any special exceptions with respect to their size, shape, material selection and technical concept such that the selection criteria known in the pertinent field can be applied without limitations.

LIST OF NUMERALS 1 snap fit arrangement
10 first part
11 second part
12 engagement hook
13 latch element
14 auxiliary tool
15 blade extension
16 fitting direction
17 tool moving direction
18 metallic engagement edge
19 front surface
20 shaft element
21 opening
22 tilting effect
23 spring-back behavior

The invention claimed is:

1. A method for fitting a snap fit arrangement, the method comprising:
providing a first part having:
at least one opening extending in a first direction through the first part;
an engagement hook extending in the first direction from the first part;
providing an auxiliary tool aligned along an axis;
extending the auxiliary tool through the at least one opening within the first part such that the auxiliary tool contacts the engagement hook to cause the engagement hook to flex outwardly, wherein the auxiliary tool remains aligned along the axis as the auxiliary tool causes the engagement hook to flex;
providing a second part and a latch element coupled to the second part;
coupling the first part to the second part while the auxiliary tool is inserted and retained within the at least one opening; and
removing the auxiliary tool such that the engagement hook couples to the latch element.

2. The method according to claim 1, wherein flexing the engagement hook causes the engagement hook to avoid contact with the latch element while the first part is coupled to the second part.

3. The method according to claim 1, wherein:
the engagement hook comprises at least one blade extension; and
when the auxiliary tool interacts with the engagement hook, the auxiliary tool contacts the at least one blade extension such that the engagement hook flexes.

4. The method according to claim 3, wherein the first part is provided as a metallic blanked part and the second part is provided as a plastic part, and wherein when the first part is coupled to the second part, a metallic engagement edge of the engagement hook is held away from a front surface of the plastic latch element.

5. A fitting arrangement comprising:
a first part including:
an engagement hook protruding in a first direction from the first part; and
at least one opening extending in the first direction through the first part;
a second part including a latch element, wherein when the fitting arrangement is in a first configuration, the second part is positioned and located apart from the first part, and wherein when the fitting arrangement is in a second configuration, the second part is positioned and located adjacent to the first part;
an auxiliary tool;
wherein when the fitting arrangement is in the first configuration or the second configuration, the auxiliary tool is selectively receivable in the at least one opening such that the auxiliary tool contacts the engagement hook to cause the engagement hook to flex outwardly;
wherein the auxiliary tool is aligned in a tool direction as the auxiliary tool is inserted within the at least one opening, and wherein the auxiliary tool remains aligned in the tool direction as the auxiliary tool causes the engagement hook to flex; and
wherein when the fitting arrangement is in the second configuration and the auxiliary tool is removed from the at least opening, the engagement hook couples to the latch element.

6. The fitting arrangement according to claim 5, wherein the auxiliary tool includes at least one shaft element composed of steel.

7. The fitting arrangement according to claim 5, wherein the at least one opening includes two openings, and wherein the auxiliary tool comprises two shaft elements configured to be received into the two openings of the first part.

8. A snap fit arrangement comprising:
a first part including at least one opening extending through the first part and an engagement hook extending away from the first part;
a second part including a latch element, wherein when the snap fit arrangement is in a first configuration, the second part is positioned and located apart from the first part, and wherein when the snap fit arrangement is in a second configuration, the second part is positioned and located adjacent to the first part; and
an auxiliary tool configured to be received within and extended through the at least one opening when the snap fit arrangement is in either the first configuration or the second configuration, and wherein when the auxiliary tool is received within and extended through the at least one opening, the auxiliary tool contacts the engagement hook causing the engagement hook to flex outwardly such that the snap fit arrangement is moveable between the first configuration and the second configuration.

9. The snap fit arrangement of claim 8, wherein the first part is provided as a metallic blanked part, and the second part is provided as a plastic part.

* * * * *